United States Patent [19]
Oliver et al.

[11] Patent Number: 5,639,573
[45] Date of Patent: Jun. 17, 1997

[54] POLYMER GEL ELECTROLYTE

[75] Inventors: Manuel Oliver, Norcross; Paul J. Gies, Atlanta; Shekhar L. Pendalwar, Lawrenceville; Christen E. Coalson, Atlanta; Florence O. Eschbach, Duluth, all of Ga.

[73] Assignee: Motorola, Inc., Schaumburg, Ill.

[21] Appl. No.: 638,706

[22] Filed: Apr. 29, 1996

Related U.S. Application Data

[63] Continuation-in-part of Ser. No. 518,732, Aug. 24, 1995.

[51] Int. Cl.$^6$ ............................................. H01M 6/18
[52] U.S. Cl. ................................. 429/190; 409/192
[58] Field of Search ............................. 429/190, 192, 429/194, 218, 133, 134, 247, 249, 250, 251; 252/62.2

[56] References Cited

U.S. PATENT DOCUMENTS

| | | | |
|---|---|---|---|
| 5,016,991 | 5/1991 | Mason | 350/357 |
| 5,176,969 | 1/1993 | Miyabayashi | 429/212 |
| 5,290,644 | 3/1994 | Andrieu | 424/129 |
| 5,296,318 | 3/1994 | Gozdz et al | 429/192 |
| 5,385,679 | 1/1995 | Uy et al. | 252/500 |
| 5,387,482 | 2/1995 | Anani | 429/191 |
| 5,429,890 | 7/1995 | Pynenburg et al. | 429/192 |
| 5,437,943 | 8/1995 | Fujii | 429/192 |
| 5,460,903 | 10/1995 | Hubbard | 429/190 |

OTHER PUBLICATIONS 0 167–2738/86 1987 (Month N/A) Solid State Ionics 18 & 19 (North Holland, Amsterdam, pp. 282–286.
0032–3861/91/183 422–04 1991 (Month N/A) Polymer, 1991, vol. 32, No. 18, pp. 3422–3425.
Abstract No. 117 Oct. 1994 Extended Abstracts, Oct. 1994 ECS Mtg. pp. 184–185.

*Primary Examiner*—M. Nuzzolillo
*Attorney, Agent, or Firm*—Kenneth M. Massaroni

[57] ABSTRACT

An electrolyte system (40) for use in connection with an electrochemical cell (10). The cell (10) includes a positive electrode (20) and a negative electrode (30) with the electrolyte system (40) disposed therebetween. The electrolyte system is a polymer gel electrolyte system including an electrolyte active species which may be either aqueous or non-aqueous and a polymer gel electrolyte support structure. The blended polymer gel electrolyte support structure includes at least a first phase adapted to absorb or otherwise engage the electrolyte active species disposed on and through the pores of a second phase which is substantially inert and does not absorb the electrolyte active species.

15 Claims, 3 Drawing Sheets

POLYMER GEL ELECTROLYTE

CROSS REFERENCE TO RELATED APPLICATIONS

This is a continuation-in-part of U.S. patent application Ser. No. 08/518,732, filed Aug. 24, 1995 in the name of Manuel Oliver and assigned of record to Motorola, Inc.

TECHNICAL FIELD

This invention relates in general to the field of electrolytes for electrochemical cells, and more particularly to polymer electrolytes for such cells.

BACKGROUND OF THE INVENTION

There has been a great deal of interest in developing better and more efficient methods for storing energy for applications such as radio communication, satellites, portable computers, and electric vehicles to name but a few. Accordingly, there have been recent concerted efforts to develop high energy, cost effective batteries having improved performance characteristics.

Rechargeable, or secondary cells are more desirable than primary (non-rechargeable) cells since the associated chemical reactions which take place at the positive and negative electrodes of the battery are reversible. Electrodes for secondary cells are capable of being regenerated (i.e. recharged) many times by the application of an electrical charge thereto. Numerous advanced electrode systems have been developed for storing electrical charge. Concurrently, much effort has been dedicated to the development of electrolytes capable of enhancing the capabilities of electrochemical cells.

Heretofore, electrolytes have been either liquid electrolytes as are found in conventional wet cell batteries, or solid films as are available in newer, more advanced battery systems. Each of these systems have inherent limitations, and related deficiencies which make them unsuitable for various applications.

Liquid electrolytes, while demonstrating acceptable ionic conductivity, tend to leak out of the cells into which they are sealed. While better manufacturing techniques have lessened the occurrence of leakage, cells still do leak liquid electrolytes from time to time. This is particularly true of current lithium ion cells. Moreover, any leakage in the cell lessens the amount of electrolyte available in the cell, thus reducing the effectiveness of the cell. Cells using liquid electrolytes are also not available for all sizes and shapes of batteries.

Conversely, solid electrolytes are free from problems of leakage. However, they have vastly inferior properties as compared to liquid electrolytes. For example, conventional solid electrolytes have ionic conductivities in the range of $10^{-5}$ S/cm (Siemens per centimeter). Whereas acceptable ionic conductivity is $>10^{-3}$ S/cm. Good ionic conductivity is necessary to ensure a battery system capable of delivering usable amounts of power for a given application. Good conductivity is necessary for the high rate operation demanded by, for example, cellular telephones and satellites. Accordingly, solid electrolytes are not adequate for many high performance battery systems.

While solid electrolytes are intended to replace the combination of liquid electrolytes and separators used in conventional batteries, the limitations described hereinabove have prevented them from being fully implemented. One class of solid electrolytes, specifically gel electrolytes, have shown some promise. Gel electrolytes contain a significant fraction of solvents (or plasticizers) in addition to the salt and polymer of the electrolyte itself. One processing route that can be used to assemble a battery with a gel electrolyte is to leave out the solvent until after the cell is fabricated. The cell may then be immersed in the solvent and a gel is formed as the solvent is absorbed. Two problems, however, may arise during solvent absorption: (1) the gel electrolyte may lack sufficient mechanical integrity to prevent shorting between the electrodes; and/or (2) excessive swelling accompanies the gel formation. Each of these problems is a significant limitation to the successful implementation of gel electrolytes in electrochemical cells.

Accordingly, there exists a need for a new electrolyte system which combines the properties of good mechanical integrity, as well as the ability to absorb sufficient amounts of liquid electrolytes so as to produce an electrolyte with the high ionic conductivity of liquid electrolytes. The electrolytes so formed should also avoid excessive swelling, and all the problems associated therewith.

DETAILED DESCRIPTION OF THE PREFERRED EMBODIMENT

Figure 1:
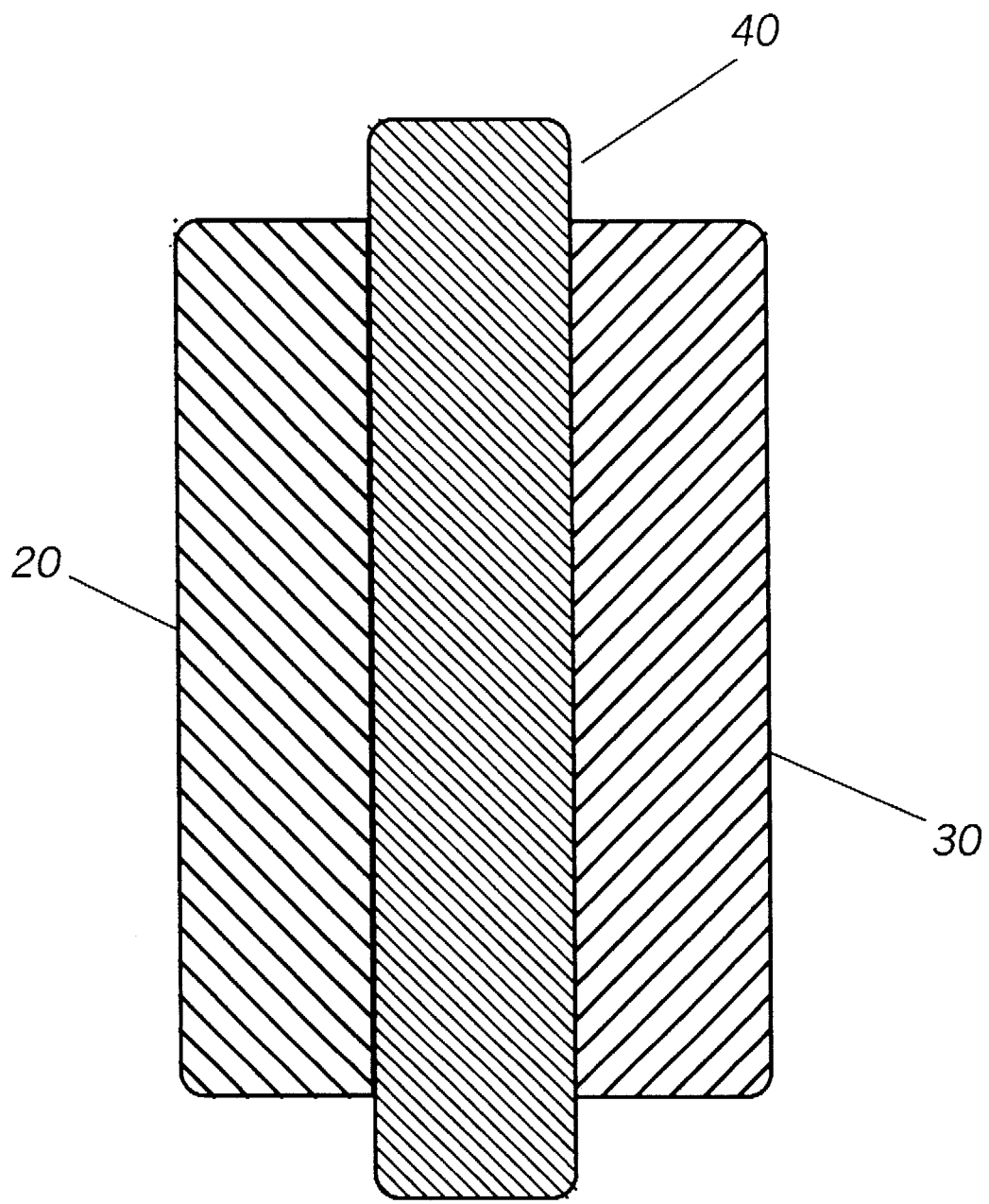
FIG. 1 is a schematic representation of an electrochemical cell in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell in accordance with the instant invention. The cell 10 includes a positive electrode 20 and a negative electrode 30. The positive electrode 20 may be fabricated of any of a number of chemical systems known to those of ordinary skill in the art. Examples of such systems include lithium manganese oxide, lithium nickel oxide, lithium cobalt oxide, lithium vanadium oxide, and combinations thereof. The negative electrode 30 may likewise be fabricated from any of a number of electrode materials known to those of ordinary skill in the art. Selection of the negative electrode material is dependent on the selection of the positive electrode so as to assure an electrochemical cell which will function properly for a given application. In this context, the negative electrode may be fabricated from alkali metals, alkali metal alloys, carbon, graphite, petroleum coke, and combinations thereof. The types of negative and positive electrode materials recited above are typically associated with lithium battery cells. It is to be noted however that the invention is not so limited; the polymer electrolyte system of the instant invention may be advantageously employed with nickel-cadmium, nickel-metal hydride, lead-acid, or any other battery system.

Operatively disposed between the positive 20 and negative 30 electrodes is an electrolyte system 40. The electrolyte system 40 comprises a polymer system including at least two polymers adapted to function as a support structure, and an electrolyte active species. The electrolyte active species may be either a liquid or solid, and may further include a plasticizer or solvent. Preferably, the electrolyte active species is a liquid electrolyte adapted to promote ion transport between the positive and negative electrodes, which liquid is absorbed into the polymer system.

Performance limitations of gel electrolytes stem from their lack of mechanical integrity to prevent electrical shorting between the electrodes. To overcome this, the thickness of the gel electrolyte (e.g. 75 mm) is typically larger than that of traditional separator materials (e.g. 25 mm) used in cells containing a liquid electrolyte. This increased electrolyte thickness results in a higher electrolyte impedance and a lower energy density for the cell. The instant polymer electrolyte system solves these problems by providing a polymer system, in which at least one polymer is provided for purposes of absorbing the electrolyte active species, while at least a second polymer, which either does not absorb electrolytes or at best absorbs very little electrolyte, provides mechanical integrity. As the mechanical integrity is improved, shorting between the electrodes is reduced or eliminated. The polymer system thus includes at least two phases; an absorbing phase and an inert phase.

It is to be understood that while the system described above refers to two phases, the invention is not so limited. Indeed, the polymer electrolyte system may be a multiphase system in which one or more phases contribute to electrolyte active species absorption, and one or more phases contributes to improved mechanical integrity. The operative distinction however is the presence of discrete phases in a polymer system, as opposed to the copolymers common in other polymeric electrolyte systems.

The liquid electrolyte dispersed in the polymer system is selected to optimize performance of the positive 20 and negative 30 electrode couple. Thus, for lithium type cells the liquid electrolyte absorbed by the polymer system is typically a solution of an alkali metal salt, or combination of salts, dissolved in a non-protonic organic solvent or solvents. Typical alkali metal salts include, but are not limited to, salts having the formula $M^+X^-$ where $M^+$ is an alkali metal cation such as $Li^+$, $Na^+$, $K^+$ and combinations thereof; and $X^-$ is an anion such as $Cl^{31}$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3O_2)_2N^-(CF_3SO_2)_2N^-$, $(CF_3SO_2)_3C^-$, and combinations thereof. Non-protonic organic solvents include, but are not limited to, propylene carbonate (PC), ethylene carbonate (EC), diethyl carbonate (DEC), dimethyl carbonate, dipropyl carbonate, dimethyl sulfoxide, acetonitrile, dimethoxyethane, diethoxyethane, tetrahydrofuran, n-methyl-2-pyrrolidone (NMP) and combinations thereof. For other electrode combinations, other electrolyte active species, such as KOH, may be employed.

Figure 2:
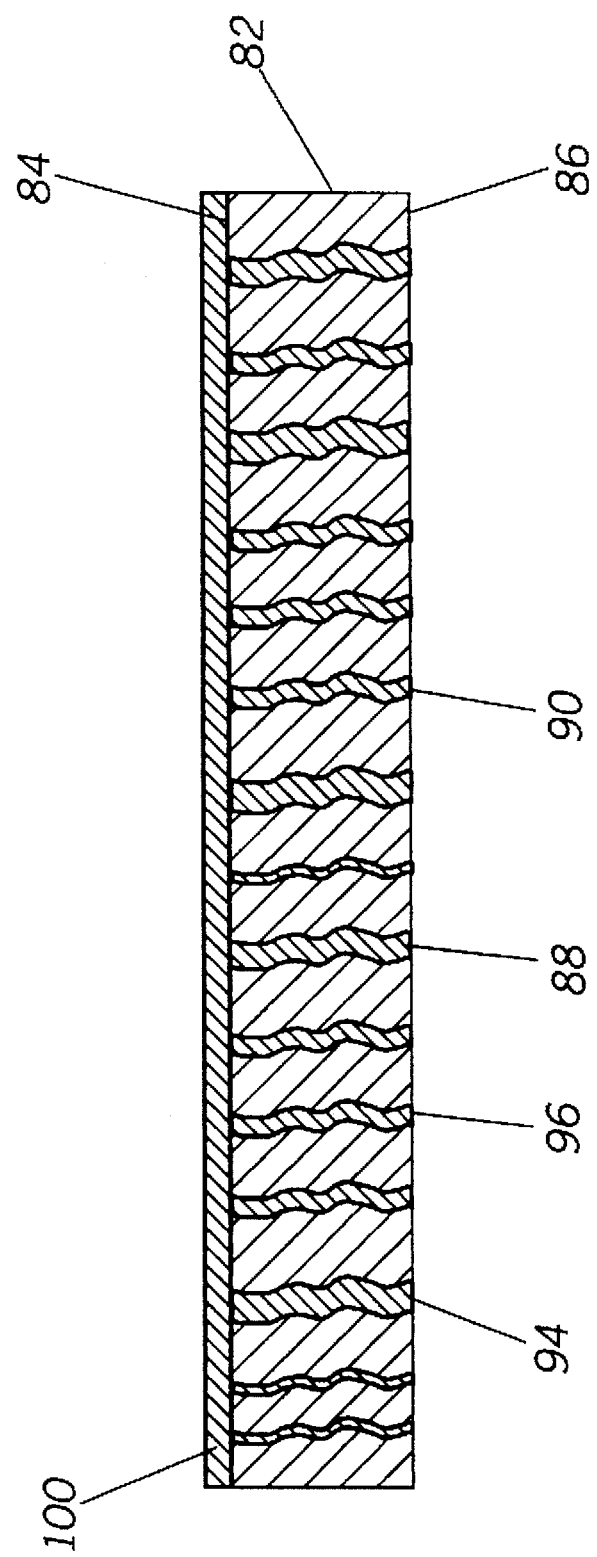
FIG. 2 is a schematic representation of an electrolyte system in accordance with the instant invention.

Referring now to FIG. 2, there is illustrated therein a schematic representation of the polymer electrolyte system in accordance with the invention. The polymer system 80 comprises a first polymer phase 82 which is formed of a layer of non-absorbing or inert polymer material. The non-absorbing or inert component, may be selected from the group consisting of polyethylene, polypropylene, polytetrafluoroethylene, polystyrene, polyethyleneterephthalate, ethylene propylene diene monomer, nylon, and combinations thereof. In this regard, it should be noted that at least one polymer in the gel polymer electrolyte system acts as a separator in the liquid electrolyte cell. The phase which acts as the separator is typically also the phase which provides mechanical stability to the entire electrolyte system.

Layer 82 includes first and second major surfaces 84 and 86 respectively. This layer may be fabricated of, for example, high density polyethylene, and is a highly porous layer having a plurality of pores, 88, 90, 92 and 94, formed therein and there through. Indeed, the porosity of the layer 82 is typically on the order of 20 and 80% and preferably between 28 and 50%. As noted above, layer 82 is the layer of non-absorbing or inert polymeric material and hence is provided to enhance the mechanical strength or integrity of the polymer electrolyte system.

Disposed on at least one of said first and second major surfaces is a layer of the absorbing gel forming polymer. The absorbing or gel forming polymer, may be selected from the group of polymers including polyvinylidene fluoride (PVDF), polyurethane, polyethylene oxide, polyacrylonitrile, polymethylmethacrylate, polyacrylamide, polyvinyl acetate, polyvinylpyrrolidinone, polytetraethylene glycol diacrylate, copolymers of any of the foregoing, and combinations thereof.

As illustrated in FIG. 2, the layer of the second polymer 100 is disposed at the top surface 84 of layer 82 and said second polymeric material extends at least partially into, and preferably through the pores in layer 82. As noted above, a second layer of the second polymeric material may be disposed on the second major surface layer 86 (not shown). By disposing a layer of the material on both sides of layer 82, it may be appreciated that the likelihood of completing filling pores 88–94 is increased.

A preferred two-polymer system in accordance with the instant invention uses a polyvinylidene fluoride-high density polyethylene polymer system. A second preferred embodiment includes PVDF and polypropylene. However, it is contemplated that the concept of using a multi-phase polymer system could easily be extended to other gel electrolyte systems, both aqueous and non-aqueous, in order to improve mechanical strength and/or limit the rate of electrolyte absorption. With respect to the relative amounts of each polymer in the system, it is contemplated that the inert or non-absorbing component may comprise between 21 and 97% of the polymer system, and preferably between 52 and 95%.

Thereafter, the polymer system illustrated in FIG. 2 is cured as by subjection to heating, radiation or by other means known in the art. Curing has the effect of driving off excess solvent in the liquid electrolyte active species causing the layer of second polymeric material 100 to gel into a contiguous sheet. For example, mixing PVDF with PC and/or EC and/or DEC containing liquid electrolyte as described hereinabove at room temperatures in a ratio of 1:1.5 yields a paste like consistency. This paste may then be spread over the polyethylene first polymeric phase as by a doctor blade or conventional coating processes. Thereafter, the PVDF paste is heated to temperatures of approximately 90° C. so that the carbonate solvents will partially dissolve PVDF. Thereafter upon cooling, the PVDF is converted to a rigid homogenous gel. During the heating process as the PVDF melts it seeps or is drawn into the pores of the high density polyethylene phase thus resulting in a "filled" two-phase polymer system.

The invention may appear to be appreciated by a perusal of the following examples.

EXAMPLE

An electrochemical cell was constructed using electrodes that were coated on mesh current collectors.

Anode:
    composition: 88% graphite, 12% PVDF
    current collector: Copper expanded metal
    dimensions of coated area: 5.5 cm×31 cm
    loading: 18 mg/cm2

Cathode
    composition: 87.3% LiCoO2, 7.2% graphite, 2.4% Carbon black, 3.1% PVDF current collector: Aluminum expanded metal
    dimensions of coated area: 5.1 cm×22.5 cm
    loading: 44 mg/cm2

Electrolyte system:
    separator: polypropylene (PP), porosity approximately 38% gel electrolyte: 15% PVDF, 85% 1M LiPF6 in EC/DEC (40:60)

Electrodes were coated onto the current collectors using NMP as solvent and dried. The electrodes were compressed with a laboratory calendar to reduce the porosity of the electrodes to 30–40%. Ni and Al tabs were welded to the current collectors of the anode and cathode, respectively. Before cell assembly the electrodes and separator were vacuum dried for 4 hours at 70° C. Cell assembly was carried out in a dry glovebox environment. Both electrodes and separator were coated with the gel electrolyte while stacking. The resultant stack was folded to reduce the length to approximately 8 cm. The cell was then vacuum heat sealed in flexible metal foil laminate packaging. After packaging the cell was heated for 5 minutes at 90° C. to convert the PVDF/liquid electrolyte dispersion into a mechanically rigid gel. The cell was then charged and discharged between 3.0 and 4.2 V. Charging was done at 100 mA, tapering to 25 mA and discharging was carried out at 100 mA. One hour rests were used after charging and discharging.

Figure 3:
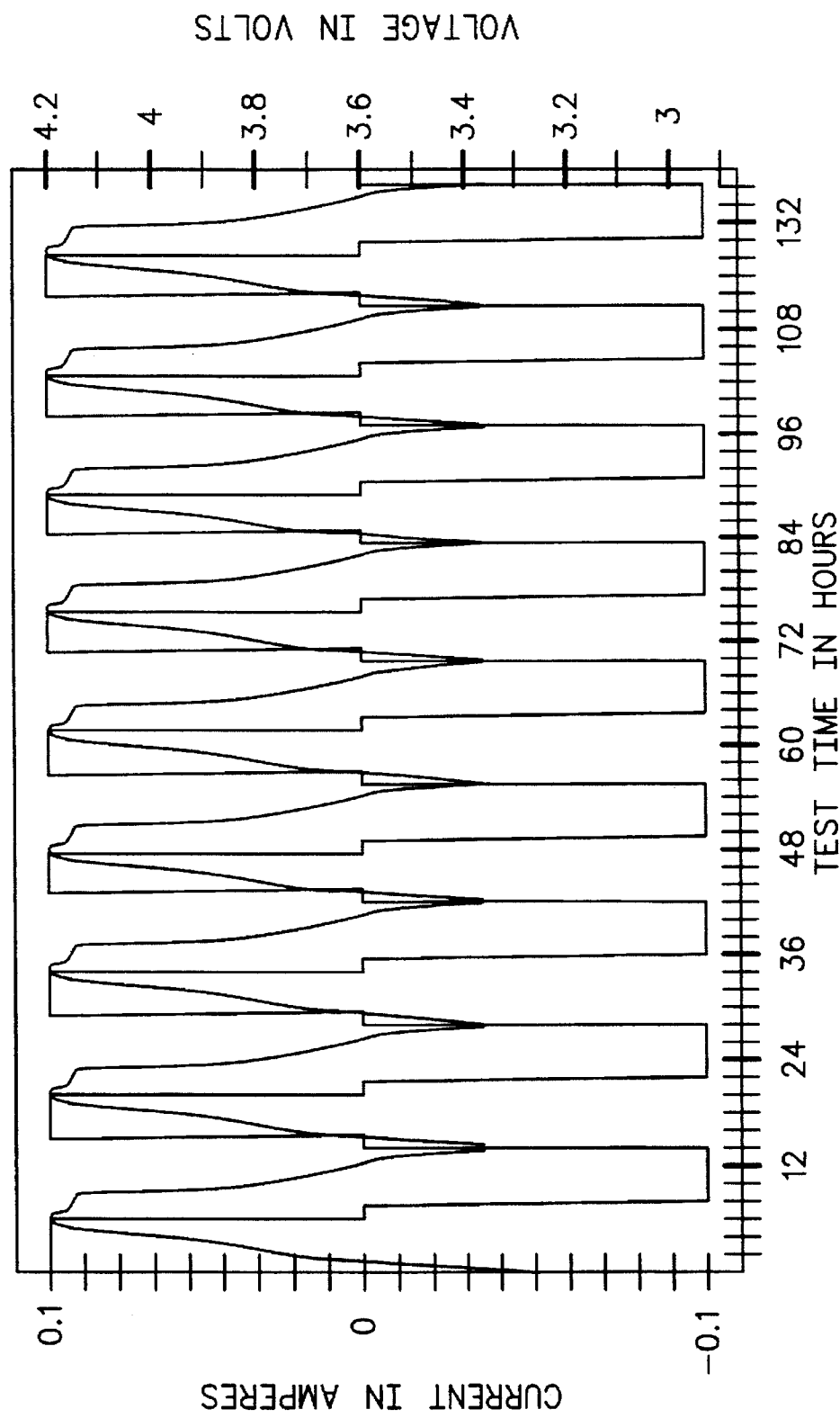
FIG. 3 is a chart illustrating cycling curves for an electrochemical cell incorporating an electrolyte system in accordance with the instant invention.

Cycling curves for the resulting cell are shown in FIG. 3, which demonstrate that a reversible cell can be obtained with the use of the two-phase gel electrolyte system. In this cell, the electrolyte system between the electrodes yields a polymer composition of 89% PP and 11% PVDF. Within the electrodes where shorting is not an issue, no inert polymer is present and the electrolyte exists as a single-phase gel.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A polymer gel electrolyte system for use in an electrochemical cell having positive and negative electrodes, said polymer gel electrolyte system comprising:
    a multiphase polymer support structure having at least a first porous polymer phase and a second polymer phase disposed at least partially on the pores of said porous first polymer phase; and
    an electrolyte active species dispersed in said second polymer phase to promote ion transport between said positive and negative electrodes.

2. A polymer gel electrolyte system as in claim 1, wherein said electrolyte active species is a liquid electrolyte.

3. A polymer gel electrolyte system as in claim 1, wherein said second phase polymer is selected from the group consisting of polyvinylidene fluoride (PVDF), polyurethane, polyethylene oxide, polyacrylonitrile, polymethylmethacrylate, polyacrylamide, polyvinyl acetate, polyvinylpyrrolidinone, polytetraethylene glycol diacrylate, copolymers of any of the foregoing, and combinations thereof.

4. A polymer gel electrolyte system as in claim 1, wherein said first phase polymer is selected from the group consisting of polyethylene, polypropylene, polytetrafluoroethylene, polystyrene, polyethyleneterephthalate, ethylene propylene diene monomer, nylon, and combinations thereof.

5. A polymer gel electrolyte system as in claim 2, further including a solvent selected from the group consisting of propylene carbonate, ethylene carbonate, diethyl carbonate, dimethylcarbonate, dipropylcarbonate, dimethylsulfoxide, acetonitrile, dimethoxyethane, tetrahydrofuran, n-methyl-2-pyrrolidone and combinations thereof.

6. A polymer gel electrolyte system as in claim 2, wherein said electrolyte active species includes an alkali metal salt having the formula $M^+X^-$, where:

$M^+$ is an alkali metal cation selected from the group consisting of $Li^+$ and $Na^+$, $K^+$; and $X^-$ is a anion selected from the group consisting of $Cl^{31}$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3O_2)_2N_2^-$, $(CF_3SO_2)_3C^-$, and combinations thereof.

7. A polymer gel electrolyte system as in claim 1, wherein said electrolyte active species is $LiPF_6$, in a propylene carbonate/ethylene carbonate solvent and wherein said polymer support structure includes a first phase consisting of polyethylene, or polypropylene and a second phase consisting of polyvinylidene fluoride.

8. A polymer gel electrolyte system as in claim 1, wherein the first phase polymer comprises between 21 and 97% of the multiphase polymer support structure.

9. A gel electrolyte system as in claim 1, wherein the first phase polymer comprises between 52 and 95% of the multiphase polymer support structure.

10. A polymer gel electrolyte system for use in an electrochemical cell having positive and negative electrodes, said polymer gel electrolyte system comprising:
    a liquid electrolyte active species for promoting ion transport between said positive and said negative electrodes; and
    a multiphase polymer blend gel electrolyte support structure including at least a first polymer phase for absorbing said electrolyte active species, said first polymer phase being fabricated of one or more polymers selected from the group consisting of polyvinylidene fluoride (PVDF), polyurethane, polyethylene oxide, polyacrylonitrile, polymethylmethacrylate, polyacrylamide, polyvinyl acetate, polyvinylpyrrolidinone, polytetraethylene glycol diacrylate, copolymers of any of the foregoing, and combinations thereof and disposed on a sheet of a second polymer fabricated of one or more polymers selected from the group consisting of polyethylene, polypropylene, polytetrafluoroethylene, polystyrene, polyethyleneterephthalate, ethylene propylene diene monomer, nylon, and combinations thereof.

11. A gel electrolyte system as in claim 10, wherein said liquid electrolyte active species includes a solvent selected from the group consisting of propylene carbonate, ethylene carbonate, diethyl carbonate, dimethylcarbonate, dipropylcarbonate, dimethylsulfoxide, acetonitrile, dimethoxyethane, tetrahydrofuran, n-methyl-2-pyrrolidone and combinations thereof.

12. A gel electrolyte system as in claim 10, wherein said liquid electrolyte active species includes an alkali metal salt having the formula $M^+X^-$, where:

$M^+$ is an alkaline metal cation selected from the group consisting of $Li^+$ and $Na^+$, $K^+$; and $X^-$ is a anion selected from the group consisting of $Cl^{31}$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3SO_2)_2N_2^-(CF_3SO_2)_3C^-$, and combinations thereof.

13. A gel electrolyte system as in claim 10, wherein said electrolyte active species is $LiPF_6$, in a propylene carbonate/ethylene carbonate solvent and wherein said polymer blend includes a first phase consisting of polyvinylidene fluoride and a second phase consisting of polyethylene or polypropylene.

14. A gel electrolyte system as in claim 10, wherein the second phase polymer comprises between 21 and 59% of the two phase polymer support structure.

15. A gel electrolyte system as in claim 10, wherein the second phase polymer comprises between 52 and 95% of the multiphase polymer support structure.

* * * * *